US006788935B1

(12) United States Patent
McKenna et al.

(10) Patent No.: US 6,788,935 B1
(45) Date of Patent: Sep. 7, 2004

(54) AIRCRAFT-BASED NETWORK FOR WIRELESS SUBSCRIBER STATIONS

(75) Inventors: Daniel B. McKenna, Steamboat Springs, CO (US); James E. Stinehelfer, Broomfield, CO (US)

(73) Assignee: Aircell, Inc., Louisville, CO (US)

( * ) Notice: Subject to any disclaimer, the term of this patent is extended or adjusted under 35 U.S.C. 154(b) by 600 days.

(21) Appl. No.: 09/686,923

(22) Filed: Oct. 11, 2000

Related U.S. Application Data (63) Continuation-in-part of application No. 09/379,825, filed on Aug. 24, 1999, now Pat. No. 6,408,180, which is a continuation-in-part of application No. 08/960,183, filed on Oct. 29, 1997, now Pat. No. 6,108,539, which is a continuation-in-part of application No. 08/027,333, filed on Mar. 8, 1993, now Pat. No. 5,444,762, and a continuation-in-part of application No. 07/847,920, filed on Mar. 6, 1992, now Pat. No. 5,557,656.

(51) Int. Cl.[7] .................................................. H04Q 7/20
(52) U.S. Cl. ..................... 455/431; 455/11.1; 455/422.1; 455/427
(58) Field of Search ................................ 455/431, 427, 455/422.1, 11.1, 517, 12.1

(56) References Cited

U.S. PATENT DOCUMENTS

| 4,816,828 | A |   | 3/1989  | Feher            |         |
|-----------|---|---|---------|------------------|---------|
| 5,519,761 | A |   | 5/1996  | Gilhousen        |         |
| 5,873,036 | A | * | 2/1999  | Vucetic          | 455/431 |
| 6,314,286 | B1| * | 11/2001 | Zicker           | 455/517 |
| 6,392,692 | B1| * | 5/2002  | Monroe           | 455/431 |
| 6,577,419 | B1| * | 6/2003  | Hall et al.      | 398/115 |

FOREIGN PATENT DOCUMENTS

| EP | 757453    | 2/1997  |
| GB | 2327016   | 1/1999  |
| JP | 06315005  | 11/1994 |
| WO | WO98/26521| 6/1998  |
| WO | WO98/29957| 7/1998  |
| WO | WO99/22465| 5/1999  |
| WO | WO99/40749| 8/1999  |

OTHER PUBLICATIONS

Casewell, I.E. The provision of GSM cellular radio environments within passenger aircraft operating over Europe, Dec. 14, 1989, pp. 172–176.*

G. D'Aria, F. Grimaldi, A. Napolitano, and L. Ordano, "Terrestrial Flight Telephone System: Integration Issues for a Pan–European Network," p. 123–130, (Oct. 12, 1992).

* cited by examiner

*Primary Examiner*—Edward F. Urban
*Assistant Examiner*—Lana Le
(74) *Attorney, Agent, or Firm*—Patton Boggs LLP (57) ABSTRACT

The aircraft-based network for wireless subscriber stations provides wireless telecommunication services in the aircraft for both the terrestrial (ground-based) and non-terrestrial regions via the use of an aircraft based network. In addition, the aircraft-based network for wireless subscriber stations implements data transmission capabilities for use in the aircraft to provide Flight Information Services, real time monitoring of aircraft operation, as well as enhanced data communication services for the passengers in the aircraft. These wireless communications can be among aircraft occupants as well as between aircraft occupants and other destinations. This data communications capability of the aircraft-based network for wireless subscriber stations can be used to link the aircraft and its occupants to a private data communication network as well as to provide access to public data communication networks, such as the Internet. Thus, the subscriber who is equipped with a wireless subscriber station can maintain a single set of identification data (MIN, ESN) regardless of their location in the multi-dimensional cellular mobile telecommunication system and independent of the mode of operation: ground-based cellular communications or non-terrestrial cellular communications.

18 Claims, 3 Drawing Sheets

AIRCRAFT-BASED NETWORK FOR WIRELESS SUBSCRIBER STATIONS

CROSS-REFERENCE TO RELATED APPLICATIONS

This application is a continuation-in-part of U.S. patent application Ser. No. 09/379,825, filed Aug. 24, 1999 U.S. Pat No. 6,408,180 and titled "Ubiquitous Subscriber Station", which is a continuation-in-part of U.S. patent application Ser. No. 08/960,183, filed Oct. 29, 1997 U.S. Pat No. 6,108,539 and titled "Non-Terrestrial Subscriber Station", which is a continuation-in-part of Ser. No. 08/027,333 filed Mar. 8, 1993 U.S. Pat. No. 5,444,762, titled "Method and Apparatus for Reducing Interference Among Cellular Telephone Signals" and Ser. No. 07/847,920 filed Mar. 6, 1992 U.S. Pat. No. 5,557,656, titled "Mobile Telecommunications".

FIELD OF THE INVENTION

This invention relates to cellular communications and, in particular, to an aircraft-based network for wireless subscriber stations that provides wireless telecommunication services in the aircraft for a wide variety of services and wireless communication devices.

Problem

It is a problem in the field of cellular mobile telecommunication services to provide customers with high quality communication services in a unified manner via a wireless communication medium. Existing cellular mobile telecommunication systems serve terrestrial (termed ground-based herein) wireless subscriber stations, but this service was traditionally not extensible to non-terrestrial wireless subscriber stations due to signal interference problems between ground-based and non-terrestrial wireless subscriber stations. The above-noted U.S. Patents disclose a non-terrestrial mobile telecommunication system and a wireless subscriber station operable in such a system, which provides subscribers with cellular mobile telecommunication services in the non-terrestrial region as well as the terrestrial region.

However, most existing wireless subscriber stations are incapable of being used both in ground-based cellular mobile telecommunication systems and non-terrestrial cellular mobile telecommunication systems. In particular, there is no network operable in an aircraft that is capable of serving a plurality of wireless subscriber stations of various designs. The passengers in a commercial airliner are typically equipped with a variety of mobile wireless communication devices, such as laptop computers, cellular telephones, MP3 music players, Personal Digital Assistants (PDA), and the like (all collectively termed wireless subscriber stations herein), which are not served by any communication network when the aircraft is in flight.

Solution

The above described problems are solved and a technical advance achieved in the field by the aircraft-based network for wireless subscriber stations that provides wireless telecommunication services in the aircraft for both the terrestrial (ground-based) and non-terrestrial regions via the use of an aircraft based network. The aircraft-based network for wireless subscriber stations enables the subscriber to use their mobile wireless subscriber station in all locations for uninterrupted wireless communications services. In addition, the aircraft-based network for wireless subscriber stations implements data transmission capabilities for use in the aircraft to provide Flight Information Services, real time monitoring of aircraft operation, as well as enhanced data communication services for the passengers in the aircraft. These wireless communications can be among aircraft occupants as well as between aircraft occupants and other destinations.

This data communications capability of the aircraft-based network for wireless subscriber stations can be used to link the aircraft and its occupants to a private data communication network as well as to provide access to public data communication networks, such as the Internet. Thus, the subscriber who is equipped with a wireless subscriber station can maintain a single set of identification data (MIN, ESN) regardless of their location in the multi-dimensional cellular mobile telecommunication system and independent of the mode of operation: ground-based cellular communications or non-terrestrial cellular communications.

DETAILED DESCRIPTION

Cellular telecommunication systems provide the service of connecting wireless telecommunication customers, each having a wireless subscriber station, to both land-based customers who are served by the common carrier public telephone network as well as other wireless telecommunication customers. In such a system, all incoming and outgoing calls are routed through Mobile Telephone Switching Offices (MTSO), each of which is connected to a plurality of cell sites (base stations) which communicate with wireless subscriber stations located in the area covered by the cell sites. The wireless subscriber stations are served by the cell sites, each of which is located in one cell area of a larger service region. Each cell site in the service region is connected by a group of communication links to the Mobile Telephone Switching Office. Each cell site contains a group of radio transmitters and receivers with each transmitter-receiver pair being connected to one communication link. Each transmitter-receiver pair operates on a pair of radio frequencies: one frequency to transmit radio signals to the wireless subscriber station and the other frequency to receive radio signals from the wireless subscriber station. The first stage of a cellular communication connection is set up when a transmitter-receiver pair in a cell site, operating on a predetermined pair of radio frequencies, is turned on and a wireless subscriber station, located in the cell site, is tuned to the same pair of radio frequencies. The second stage of the communication connection is between the communication link connected to this transmitter-receiver pair and the common carrier Public Switched Telephone Network. This second stage of the communication connection is set up in the Mobile Telephone Switching Office, which is connected to the Public Switched Telephone Network by incoming and outgoing trunks. The Mobile Telephone Switching Office contains a switching network to switch wireless subscriber station voice and/or data signals from the communication link to an incoming or outgoing trunk. The Mobile Telephone Switching Office is controlled by a mobile telecommunication controller and a cell site controller at each cell site associated with the Mobile Telephone Switching Office. A plurality of data links connect the mobile telecommunication controller and the associated cell site controllers. The mobile telecommunication controller operates under control of complex software and controls the switching network. The mobile telecommunication controller also controls the actions of the associated cell site controllers by generating and interpreting the control messages that are exchanged with the associated cell site controllers over the data links. The cell site controllers at each cell site, in response to control messages from the mobile telephone switching office, control the transmitter-receiver pairs at the cell site. The control processes at each cell site also control the tuning of the wireless subscriber stations to the selected radio frequencies.

Each cell in the ground-based cellular wireless telecommunication network comprises a predetermined volume of space radially arranged around the cell site transmitting antenna with the region of space roughly approximating a cylindrical volume having limited height. Since all of the wireless subscriber stations are installed in ground-based units (such as motor vehicles or handheld units) in traditional cellular wireless telecommunication systems, the antenna radiation pattern of the cell site is aligned to be proximate to the ground and the polarization of the signals produced by the cell site antenna is vertical in nature. In order to prevent the radio signals in one cell site from interfering with radio signals in an adjacent cell site, the transmitter frequencies for adjacent cell sites are selected to be different so that there is sufficient frequency separation between adjacent transmitter frequencies to avoid overlapping transmissions among adjacent cell sites. In order to reuse the same frequencies, the cellular telecommunication industry has developed a small but finite number of transmitter frequencies and a cell site allocation pattern that ensures that two adjacent cell sites do not operate on the same frequency. When a ground-based wireless subscriber station initiates a call connection, control signals from the local cell site transmitter cause the frequency agile transponder in the ground-based wireless subscriber station to operate at the frequency of operation designated for that particular cell site. As the ground-based wireless subscriber station moves from one cell site to another, the call connection is handed off to the successive cell sites and the frequency agile transponder in the ground-based wireless subscriber station adjusts its frequency of operation to correspond to the frequency of operation of the transmitter located in the cell site in which the ground-based wireless subscriber station is presently operational.

Multi-Dimensional Cellular Wireless Telecommunication Network Architecture

Figure 1:
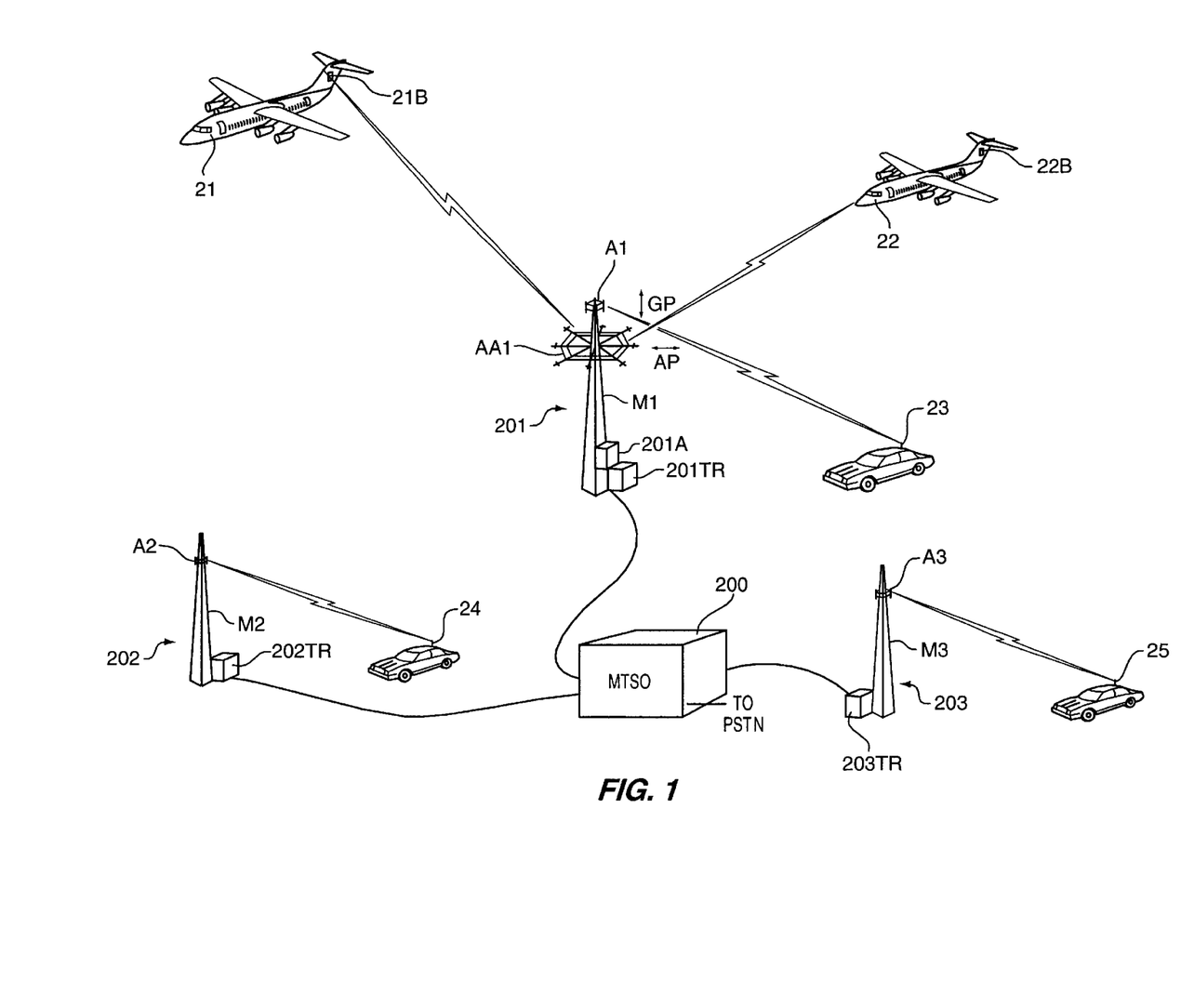
FIG. 1 illustrates, in block diagram form, the overall architecture of a multi-dimensional cellular mobile telecommunication network.

FIG. 1 illustrates, in block diagram form, the overall architecture of a multidimensional cellular wireless telecommunication network. This diagram illustrates the basic concepts of the multi-dimensional cellular wireless telecommunication network and, for the purpose of simplicity of illustration, does not comprise all of the elements found in a typical network. The fundamental elements disclosed in FIG. 1 provide a teaching of the interrelationship of the various elements which are used to implement a multi-dimensional cellular wireless telecommunication network.

The terms "cell site" and "cell" are sometimes loosely used in the literature, and the term "cell site" generally denotes the locus at which the transmitter and receiver apparatus is located, while the term "cell" generally denotes the region of space which is served by a particular transmitter-receiver pair which is installed at a cell site. The particular technology used to implement the communications between wireless subscriber stations and the transmitter-receiver pairs as well as the nature of the data transferred there between, be it voice, video, telemetry, computer data, and the like, are not limitations to the system which is described herein, since a novel system concept is disclosed, not a specific technologically limited implementation of an existing system concept. Therefore, the term "cellular" as it is used herein denotes a communication system which operates on the basis of dividing space into a plurality of volumetric sections or cells, and managing communications between wireless subscriber stations located in the cells and the associated transmitter-receiver pairs located at the cell site for each of these cells. The cellular radio telecommunication service provided in North America, for example, is designed primarily for motor vehicles and other ground-based wireless subscriber stations. The system presently in use uses a plurality of radio frequency channels in the Ultra-High Frequency (UHF) band. A channel in this system comprises a pair of UHF frequencies in the designated band. One frequency in the channel is termed the "forward" carrier and is used for transmissions from the base station to the wireless subscriber station, while the other frequency in the pair is termed the "reverse" carrier and is used for transmissions from the wireless subscriber station to the base station.

The basic ground-based cellular telecommunication network of the prior art is incorporated into this system to enable the non-terrestrial wireless subscriber stations to be integrated into the existing service structure. In particular, the mobile telecommunication switching office 200 serves to interconnect a plurality of ground-based cells 201, 202, 203 with the public switched telephone network (PSTN), as noted above. The ground-based cells 201, 202, 203 each include a transmitter-receiver pair 201TR, 202TR, 203TR and an antenna complex, which typically comprises a tower M1, M2, M3 to which is affixed one or more antenna elements A1, A2, A3, respectively.

Existing cellular wireless telecommunication systems use both directional and non-directional antenna elements to implement the desired antenna characteristic pattern. Directional antenna, as the term is used herein, does not imply that a signal is transmitted or received from a particular direction, but that the antenna has a non-isotropic radiation pattern. A directional antenna, or a plurality of directional antenna elements, is preferably used on the ground-based cellular base station to increase signal separation. The antenna structure used in ground-based cellular wireless telecommunications is such that signals emanating from the cell site transmitter antenna elements of antennas A1, A2, A3, propagate in a substantially radial direction from the antenna in all directions with the top of the antenna pattern being substantially coplanar with the Earth's surface and at a level that corresponds to the elevation of the transmitter antenna above the Earth's surface. The receiver antenna has characteristics that are analogous to that of the transmitter antenna. The polarization of these signals is vertical in nature, shown by arrow GP in FIG. 1 although there are other possible configurations, such as 45 degree slant, diversity and the like.

The multi-dimensional cellular wireless telecommunication network adds to the existing cellular wireless telecommunication network one or more non-terrestrial cells. A non-terrestrial cell is defined as an installation which is equipped with at least one non-terrestrial cell site transmitter-receiver pair, such as 201A and an associated antenna AA1 for receiving and transmitting cellular telecommunication transmissions to and from non-terrestrial wireless subscriber stations, such as aircraft 21, 22, which are equipped with wireless subscriber station apparatus 21B, 22B. The non-terrestrial transmitter-receiver pair 201A is interconnected to the Public Switched Telephone Network via the Mobile Telephone Switching Office. The non-terrestrial cell site antenna AA1 has a radio signal radiation pattern which is directed above a horizontal plane encompassing the antenna. The majority of the radiated radio signal is directed at angles above the horizontal plane, which angles are typically in the range of 1.5° to 4° in magnitude, to avoid interference with ground-based wireless telephone stations 23, 24, 25. The multi-path effect is also minimized since the energy level of the signals impinging on the reflective earth surface is reduced. In addition, the polarization of these radio signals is selected to be substantially orthogonal to the polarization of the radio signals emanating from the ground-based antennas, and is typically horizontally polarized, as shown by arrow AP in FIG. 1.

The non-terrestrial cell site transmitter-receiver pair 201A can be integrated with an existing ground-based cell site transmitter-receiver pair, in that there is some sharing of equipment which mounts the antenna elements on a common tower M1 and/or interconnects both cell site transmitter-receiver pairs to the Public Switched Telephone Network PSTN. In the embodiment of FIG. 1, the non-terrestrial cell site antenna elements M1 are mounted on the same tower M1 as the antenna elements A1 used to implement the ground-based cell site. The non-terrestrial cell site antenna elements AA1 are typically mounted below the existing antenna elements A1 used to implement (or reserved for) the ground-based cell site, which also reduces the ground footprint, thus reducing the Service Area Boundary as it exists for a ground-based mobile.

Figure 2:
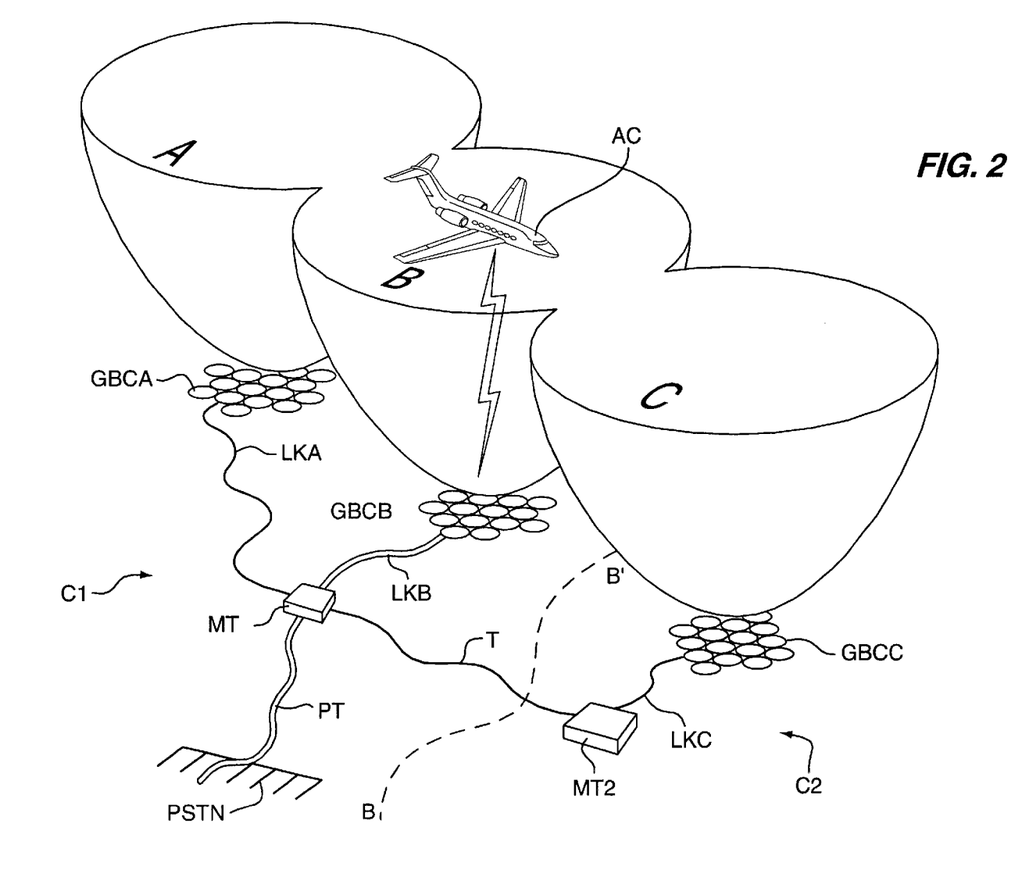
FIG. 2 illustrates, in block diagram form, additional details of the architecture of the non-terrestrial component of the multi-dimensional cellular telecommunication network.

FIG. 2 illustrates in block diagram view, additional details of the architecture of the non-terrestrial component of the multi-dimensional cellular telecommunication network where the non-terrestrial wireless subscriber station is located in an aircraft AC which is located in non-terrestrial cell B, which non-terrestrial cell overlays a plurality of ground-based cells GBCB. Two additional non-terrestrial cells A, C are also shown, each of which overlays another plurality of ground-based cells GBCA, GBCC, respectively. The three non-terrestrial cells A–C are shown as being oriented adjacent to each other, with cell B being located between non-terrestrial cells A and C. It is typical that other non-terrestrial cells would be implemented adjacent to non-terrestrial cells A–C to provide complete coverage of the non-terrestrial space that extends above the ground. For simplicity of description, only three non-terrestrial cells A–C are shown in FIG. 2. The existing ground-based cells are each connected via trunks LKA–LKC to an associated Mobile Telephone Switching Office MT1, MT2, which are themselves connected together via trunk T and to Public Switched Telephone Network PSTN via trunks PT. In this environment, it is typical that two different providers are serving the network, with a first company serving region C1 and a second company serving region C2, with the dividing line between the two service areas being shown in the figures by the dashed line B–B'. In this system environment, a call is established from a subscriber located in the aircraft AC, using a wireless subscriber station apparatus located in the aircraft AC in the well known manner of the existing ground-based cellular systems. The control signals from the wireless subscriber station apparatus located in the aircraft AC are transmitted to the cell site transmitter-receiver pair of non-terrestrial cell B, which is served by the first cellular company which provides service in region C1. The call is connected via trunk LKB to the Mobile Telephone Switching Office MT1, which interconnects the call connection to the Public Switched Telephone Network PSTN via trunk PT, in well known fashion. The call connection is then extended to the designated subscriber (not shown) which is assumed for this description to be located at a "land line" station. The allocation of frequencies and the subscriber identification for aircraft AC is managed via the non-terrestrial cell site control software which operates independent of the ground-based cellular network and which can be operational in the Mobile Telephone Switching Office MT1 which serves the non-terrestrial cell site for non-terrestrial cell B.

Architecture of the Aircraft-Based Network for Wireless Subscriber Stations

Figure 3:
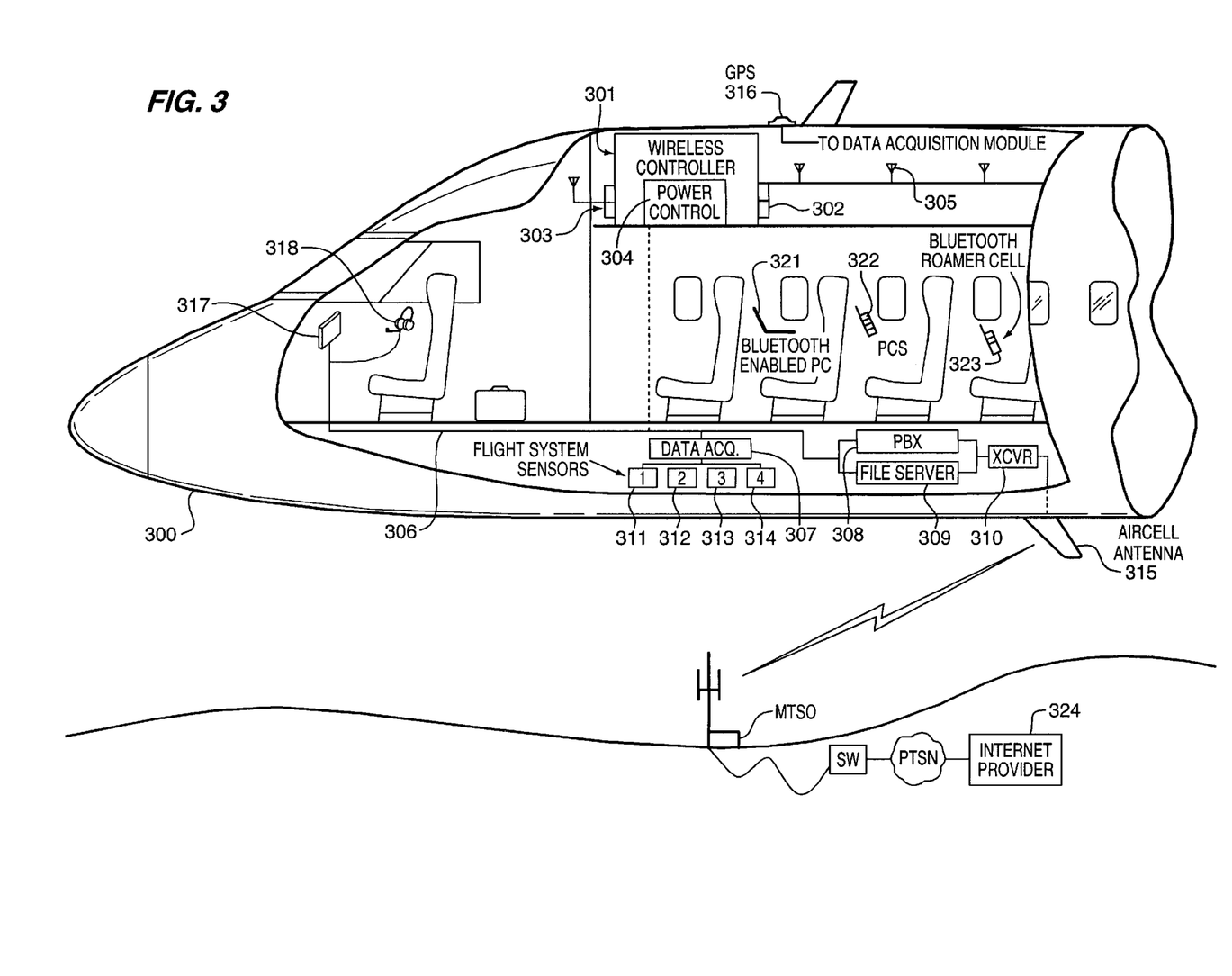
FIG. 3 illustrates, in block diagram form, the architecture of a typical embodiment of the present aircraft-based network for wireless subscriber stations.

FIG. 3 illustrates, in block diagram form, the architecture of a typical embodiment of the present aircraft-based network for wireless subscriber stations as embodied in a multi-passenger commercial aircraft 300. This system comprises a plurality of elements used to implement a communication backbone that is used to enable wireless communication for a plurality of wireless communication devices of diverse nature. The aircraft-based network for wireless subscriber stations comprises a Local Area Network 306 that includes a radio frequency communication system 301 that uses a spread spectrum paradigm and having a short range of operation. This network 306 supports both circuit switched and packet switched connections from wireless subscriber stations 321–323 and interconnects the communications of these wireless subscriber stations 321–323 via a gateway 310 to the Public Switched Telephone Network (PSTN) and other destinations, such as Internet Service provider 324, as described above. The wireless subscribers thereby retain their single number identity as if they were directly connected to the Public Switched Telephone Network. The wireless subscriber stations 321–323 include a diversity of communication devices, such as laptop computers 321, cellular telephones 322, MP3 music players (not shown), Personal Digital Assistants (PDA) (not shown), Bluetooth-based roamer cellular devices 323, and the like, and for simplicity of description are all collectively termed wireless subscriber stations herein, regardless of their implementation specific details.

The basic elements of the aircraft-based network for wireless subscriber stations comprises at least one antenna 305 located within the aircraft 300 which serves to communicate with the plurality of wireless subscriber stations 321–323 located within the aircraft 300. The at least one antenna 305 is connected to a wireless controller 301 that encompasses a plurality of elements that serve to regulate the wireless communications with the plurality of wireless subscriber stations 321–323. The wireless controller 301 includes at least one low power radio frequency transceiver 302 for providing a voice-based circuit switched communication space using a wireless communication paradigm, such as PCS. In addition, the wireless controller 301 includes a low power radio frequency transceiver 303 for providing a data-based packet switched communication space using a wireless communication paradigm, such as Bluetooth. Finally, the wireless controller 301 includes a power control segment 304 that serves to regulate the power output of the plurality of wireless subscriber stations. The ultra-low airborne transmit power levels feature represents a control by the Power Control element 304 of the wireless controller 301 of the aircraft-based network for wireless subscriber stations to regulate the output signal power produced by the wireless subscriber stations 321–323 to minimize the likelihood of receipt of the non-terrestrial cellular signal by ground-based cell sites or ground-based subscriber stations. The power level of the signal transmitted by the wireless subscriber station 321–323 is typically less than 5 milliwatts at lower altitudes (up to 5,000 feet). This magnitude output signal strength represents a significant departure from the standard ground-based cellular signal strength, and the non-terrestrial cellular signals are therefore typically rejected by the ground-based cell sites and ground-based subscriber stations. The wireless subscriber station apparatus 321–323 can include an attenuator which serves to reduce the power output of the transmitter so that a reduced output level is maintained.

It is obvious that these above-noted segments of the wireless controller 301 can be combined or parsed in various ways to produce an implementation that differs from that disclosed herein. The particular implementation described is selected for the purpose of illustrating the concept of the invention and is not intended to limit the applicability of this concept to other implementations.

The wireless controller 301 is connected via a backbone network 306 to a plurality of other elements which serve to provide services to the wireless subscriber stations 321–323. These other elements can include a file server 309 for providing data storage and management functions for the data transmissions of the wireless subscriber stations. A Private Branch Exchange element 308 comprises a telephone services module that can provide telephone communication services to interconnect wireless subscriber stations 321–323 and headset 318 and also provide advanced communication services such as call forwarding, call waiting, call conferencing, data call communications, caller ID, last call redial, and the like. A data acquisition element 307 serves to interface with a plurality of flight system sensors 311–314 and a Global Positioning System element 316 to collect data from a plurality of sources as described below. Furthermore, pilot communication devices, such as the display 317 and headset 318, are connected to this backbone network 306 either via a wired connection or a wireless connection.

Finally, a gateway transceiver 310 is used to interconnect the Private Branch Exchange 308 and File Server 309 elements to an antenna 315 to enable signals to be transmitted from the aircraft-based network for wireless subscriber stations to transceivers located on the ground as described above with respect to FIGS. 1 and 2. Included in these components is a communications router function to forward the communication signals to the proper destination. Thus, signals that are destined for subscribers on the aircraft are routed to these individuals while signals routed to subscribers located, for example, on the ground and routed to the terrestrial network. Aircraft antenna patterns that minimize nadir (Earth directed) effective radiated power (ERP) are used in the implementation of the antenna(s) 315 on the aircraft to serve the aircraft-based network for wireless subscriber stations. Two commonly used antenna types are a belly mounted blade and a vertical stabilizer mounted blade antenna. The belly mounted blade antenna uses a vertical slot in which the E-Field is horizontally polarized. This slot antenna has a pattern which is the complement to a dipole arranged in a vertical plane but has orthogonal polarization. The pattern thereby exhibits a null toward the earth (nadir) which is the direction for minimal slant range and hence minimal propagation loss. The level of energy is greatly reduced due to this pattern shaping, but is still orthogonally polarized with respect to ground-based antenna patterns. The second antenna type is a horizontally mounted blade antenna deployed on either side of the vertical stabilizer. This antenna uses a dipole type of radiating element that is horizontally polarized. The horizontal stabilizer of the aircraft is mounted between this horizontally mounted blade antenna and the earth, thereby greatly reducing the power directed toward the earth (nadir). The wireless subscriber station operates with tightly controlled dynamic power control settings. The Mobile Telephone Switching Office is programmed to have a very tight dynamic power control range (typically ±one power step), which power is set very low, as noted above.

Operation of the Aircraft-Based Network for Wireless Subscriber Stations

When a subscriber enters the aircraft, their wireless subscriber station(s) 321–323 register with the voice-based or data-based cell (or both) of the aircraft-based network for wireless subscriber stations that is operational in the aircraft so the subscriber information that is relevant to the use of the wireless subscriber station 321–323 is received by the cell, including selected data from the class of wireless communication data including: billing information, user name, user profile information, wireless subscriber station telephone number, subscriber IP address, wireless subscriber station identity & characteristics, and the like. The wireless subscriber stations that are voice based use the voice-based cell for CDMA communications, while the wireless subscriber stations that are data-based use the wireless Local Area Network (also termed data-based cell herein), implemented using an appropriate protocol, such as the frequency hopped scheme defined in the Bluetooth specification. The wireless subscriber stations not supported by the voice-based cell can communicate via the wireless local area network 301 and are sent control signals to reduce their normal cellular operating power to a low (or zero) power level compatible with the operation of wireless devices within the aircraft.

The communication needs associated with an aircraft include, but are not limited to, the classes of services noted herein:

Occupant data communications

Telemetry relay

Aircraft safety and maintenance

Pilot-Controller communications

Aircraft operations support

Each of these categories represents an opportunity to use the inherent communications capabilities of the aircraft-based network for wireless subscriber stations in a transparent manner. The voice communications activity in a wireless subscriber station is typically only a minimal use of the communication capacity of the aircraft-based network for wireless subscriber stations. Therefore, as shown in FIG. 3, the aircraft-based network for wireless subscriber stations can be interconnected with a plurality of existing apparatus in the aircraft or with newly installed equipment to provide these services.

The data communication capability of the wireless subscriber station can be enhanced by increasing the bandwidth of the communication connection that is established with the cell site, in the case of the data-based cell. There are a number of ways to provide an increased bandwidth, including allocating multiple communication channels to the data communication function. Thus, a single call connection for data communication purposes comprises multiple physical communication channels managed in parallel to thereby multiply the data communication capacity associated with a single channel in the system. Alternatively, dedicated data communication channels can be allocated in the defined communication space, with the data communication channels occupying the bandwidth of multiple voice communication channels. In either case, the data communication capability of the wireless subscriber station can be adapted to suit the needs of the aircraft and its operation.

Occupant Communications

A first example is the occupant data communications class of service wherein the aircraft occupants can use a personal computer, equipped with a modem, to thereby enable the user to transmit and receive data over the cellular voice communication connection to the aircraft-based network for wireless subscriber stations. The data can include facsimile transmissions, Internet access, E-Mail, data files and the like. Additionally, the terminal device can include a video display and the data displayed thereon can be entertainment and/or informational programs that are retrieved from a program data storage system resident in the aircraft or uploaded from the cell site or a source connected to the aircraft-based network for wireless subscriber stations via a cellular communication connection. Additionally, the wireless subscriber station can have a built-in modem for the provision of data communication functions to any user selected peripheral device (not shown) to extend the capabilities of this apparatus.

Aircraft Safety and Maintenance

The aircraft-based network for wireless subscriber stations can also be connected to the avionics equipment resident in the aircraft to collect data relevant to the operation of the aircraft. The data can be collected and stored in the data storage memory for later output to an aircraft monitoring system on the ground, or the data can be transmitted to an aircraft monitoring system on the ground during an existing voice communication call, or the communication link can be automatically activated to originate a data transfer call. The control circuit in the aircraft-based network for wireless subscriber stations can, in well-known fashion, scan the data output terminals of the various elements of the avionics to retrieve the desired data. This enables the aircraft-based network for wireless subscriber stations to function as a real-time aircraft safety and maintenance system.

As part of the communication function, the aircraft-based network for wireless subscriber stations can function to receive weather maps from air weather services. The weather maps can be generated at a ground station and transmitted to the aircraft in a compact data representation, with the particular content of the weather map being a function of the data needs of the pilot. The aircraft-based network for wireless subscriber stations can therefore provide frequent updates to the weather maps using the data communication capabilities noted above and can enable the pilot to revise the flight plan and receive revised weather maps commensurate with the revised flight plan.

Pilot-Controller Communications

The aircraft has an existing set of communications equipment for pilot to air traffic controller communications. The aircraft-based network for wireless subscriber stations can function as a redundant communication facility to supplement these existing facilities. Alternatively, the aircraft-based network for wireless subscriber stations can exclusively perform this function. Furthermore, the aircraft-based network for wireless subscriber stations can add GPS aircraft position data to the information communicated to the air traffic control systems for accurate aircraft position updates. For example, if the pilot were to dial the emergency services access code ("911" in the US and "119" elsewhere) when airborne, the aircraft-based network for wireless subscriber stations can automatically route the call to the nearest Air Route Traffic Control Center for processing.

Aircraft Operations Support

As also shown in FIG. 3, the aircraft-based network for wireless subscriber stations can be equipped with both data processing and data storage memory elements to thereby enable the aircraft-based network for wireless subscriber stations to perform additional support functions. In particular, the data related to the flight schedule of the aircraft can be stored in the data storage memory and transmitted to and received from ground-based systems via the cellular communication connections established by the aircraft-based network for wireless subscriber stations. The types of data can include: passenger manifest, gate departure assignments for connecting flights at the destination airport, and the like.

Value Added Services

The aircraft-based network for wireless subscriber stations can provide value added communication services, such as call forwarding, call waiting, call conferencing, data call communications, caller ID, last call redial, and the like. These services are part of the existing public switched telephone network and the aircraft-based network for wireless subscriber stations can be managed for call connections through this network as a traditional ground-based subscriber station.

Summary

The aircraft-based network for wireless subscriber stations enables the subscriber to use their wireless subscriber station in all locations for uninterrupted wireless communications services. In addition, the aircraft-based network for wireless subscriber stations implements data transmission capabilities for use in the aircraft to provide Flight Information Services, real time monitoring of aircraft operation, as well as enhanced data communication services for the passengers in the aircraft.

What is claimed:

1. A network for wireless subscriber stations for providing wireless communication services to a plurality of wireless subscriber stations, said network and said plurality of wireless subscriber stations being located in an aircraft, comprising:

first means for generating a radio frequency communication signal to communicate via voice-based communications with at least one of said plurality of wireless subscriber stations, comprising:
  first cellular communication means for establishing at least one voice-based circuit switched cell site to communicate via voice-based communications with at least one of said plurality of wireless subscriber stations;

second means for generating said frequency communication signal to communicate via data-based communications with at least one of said plurality of wireless subscriber stations, comprising:
  second cellular communication means for establishing at least one wireless LAN-based cell site to communicate via data-based communications with at least one of said plurality of wireless subscriber stations;

transceiver means for radio frequency communications between said aircraft and a transceiver located on the ground; and means for interconnecting said first means for generating and said second means for generating with said transceiver means to establish communications between said plurality of wireless subscriber stations and said transceiver located on the ground.

2. The network for wireless subscriber stations of claim 1 wherein said means for interconnecting comprises:
   local area network means connected to said first and said second cellular communication means and said transceiver means for exchanging data therebetween.

3. The network for wireless subscriber stations of claim 1 wherein said transceiver means comprises:
   transmitter means for generating downlink radio frequency signals for transmission to said transceiver located on the ground; receiver means for receiving uplink radio frequency signals received from said transceiver located on the ground; and
   antenna means located on an external surface of said aircraft for exchanging said downlink and uplink radio frequency signals between said transmitter and said receiver means and said transceiver located on the ground.

4. The network for wireless subscriber stations of claim 1 wherein said means for interconnecting comprises:
   local area network means connected to said first and said second means for generating a radio frequency communication signal and said transceiver means for exchanging data therebetween.

5. The network for wireless subscriber stations of claim 1 further comprising:
   data acquisition means connected to said means for interconnecting for gathering data from a plurality of sensor based systems.

6. The network for wireless subscriber stations of claim 1 further comprising:
   pilot interface means connected to said means for interconnecting for displaying data to a pilot of said aircraft.

7. The network for wireless subscriber stations of claim 1 further comprising:
   power regulation means for managing an output radio frequency power level of signals generated by said plurality of wireless subscriber stations.

8. A method of operating a network for wireless subscriber stations for providing wireless communication services to a plurality of wireless subscriber stations, said network and said plurality of wireless subscriber stations being located in an aircraft, comprising the steps of:
   generating a first radio frequency communication signal to communicate via voice-based communications with at least one of said plurality of wireless subscriber stations, comprising:
      establishing at least one voice-based circuit switched cell site to communicate via voice-based communications with at least one of said plurality of wireless subscriber stations;
   generating a second radio frequency communication signal to communicate via data-based communications with at least one of said plurality of wireless subscriber stations comprising:
      establishing at least one wireless LAN-based cell site to communicate via data-based communications with at least one of said plurality of wireless subscriber stations;
   establishing radio frequency communications between a transceiver located in said aircraft and a transceiver located on the ground; and
   interconnecting said voice-based communications and said data-based communications with said transceiver located in said aircraft to establish communications between said plurality of wireless subscriber stations and said transceiver located on the ground.

9. The method of operating a network for wireless subscriber stations of claim 8 wherein said step of interconnecting comprises:
   operating a local area network for exchanging data between said at least one voice-based circuit switched cell site, said at least one wireless LAN-based cell site, and said transceiver located in said aircraft.

10. The method of operating a network for wireless subscriber stations of claim 8 wherein said step of establishing radio frequency communications comprises:
    generating downlink radio frequency signals for transmission to said transceiver located on the ground;
    receiving uplink radio frequency signals received from said transceiver located on the ground; and
    exchanging, via an antenna located on an external surface of said aircraft, said downlink and uplink radio frequency signals with said transceiver located on the ground.

11. The method of operating a network for wireless subscriber stations of claim 8 wherein said step of interconnecting comprises:
    operating a local area network for exchanging data between said at least one voice-based circuit switched cell site, said at least one wireless LAN-based cell site, and said transceiver located in said aircraft.

12. The method of operating a network for wireless subscriber stations of claim 8 further comprising the step of:
    acquiring data from a plurality of sensor based systems.

13. The method of operating a network for wireless subscriber stations of claim 8 further comprising the step of:
    interconnecting a pilot interface to said transceiver located in said aircraft for displaying data to a pilot of said aircraft.

14. The method of operating a network for wireless subscriber stations of claim 8 further comprising the step of:
    managing an output radio frequency power level of signals generated by said plurality of wireless subscriber stations.

15. A network for wireless subscriber stations for providing wireless communication services to a plurality of wireless subscriber stations, said network and said plurality of wireless subscriber stations being located in an aircraft, comprising:
    means for establishing at least one voice-based circuit switched cell site to communicate via voice-based communications with at least one of said plurality of wireless subscriber stations;
    means for establishing at least one wireless LAN-based cell site to communicate via data-based communications with at least one of said plurality of wireless subscriber stations;
    transceiver means for radio frequency communications between said aircraft and a transceiver located on the ground; and
    means for interconnecting said means for establishing at least one voice-based circuit switched cell site and said means for establishing at least one wireless LAN-based cell site with said transceiver means to establish communications between said plurality of wireless subscriber stations and said transceiver located on the ground.

16. The network for wireless subscriber stations of claim 15 wherein said means for interconnecting comprises:

local area network means connected to said means for establishing at least one voice-based circuit switched cell site and said means for establishing at least one wireless LAN-based cell site and said transceiver means for exchanging data therebetween.

17. The network for wireless subscriber stations of claim 15 further comprising;

means, connected to said means for interconnecting, for providing voice services to said voice-based communications with at least one of said plurality of wireless subscriber stations.

18. The network for wireless subscriber stations of claim 15 further comprising:

means, connected to said means for Interconnecting, for providing data file services to said data-based communications with at least one of said plurality of wireless subscriber stations.

* * * * *